(12) United States Patent
Opoku-Agyemang et al.

(10) Patent No.: US 12,218,988 B2
(45) Date of Patent: *Feb. 4, 2025

(54) VIRTUAL MEETING INTEGRATION WITH CUSTOMER RELATIONSHIP MANAGEMENT PLATFORM

(71) Applicant: State Farm Mutual Automobile Insurance Company, Bloomington, IL (US)

(72) Inventors: Angela Opoku-Agyemang, Bloomington, IL (US); Christine Johnson, Bloomington, IL (US); Kristina Seymour, Normal, IL (US); Chad A Greer, Winter Haven, IL (US); Amit Gupta, Normal, IL (US); Sujitha Thekkin Kattil Sankaran, Bloomington, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/484,944

(22) Filed: Oct. 11, 2023

(65) Prior Publication Data
US 2024/0039968 A1    Feb. 1, 2024

Related U.S. Application Data

(63) Continuation of application No. 17/710,312, filed on Mar. 31, 2022, now Pat. No. 11,824,905.
(Continued)

(51) Int. Cl.
*H04L 65/1093* (2022.01)
*G06Q 30/01* (2023.01)
*H04L 65/403* (2022.01)

(52) U.S. Cl.
CPC ......... *H04L 65/1093* (2013.01); *G06Q 30/01* (2013.01); *H04L 65/403* (2013.01)

(58) Field of Classification Search
CPC .... H04L 65/1093; H04L 65/403; G06Q 30/01
(Continued)

(56) References Cited

U.S. PATENT DOCUMENTS

| 5,774,663 | A | 6/1998 | Randle et al. |
| 9,195,971 | B2 | 11/2015 | McConnell et al. |

(Continued)

OTHER PUBLICATIONS

Office Action for U.S. Appl. No. 17/710,312, mailed on Feb. 22, 2023, Opoku-Agyemang, "Virtual Meeting Integration With Customer Relationship Management Platform", 31 pages.
(Continued)

*Primary Examiner* — Zi Ye
(74) *Attorney, Agent, or Firm* — Lee & Hayes, P.C.

(57) ABSTRACT

A customer relationship management (CRM) platform may use data objects to store data associated with a virtual meeting. The CRM platform may store information about a virtual meeting in a meeting object, and store information about meeting participants in participant objects linked to the meeting object. The CRM platform may also store meeting information, returned from a separate virtual meeting platform that will host the virtual meeting, in the meeting object and the participant objects. Accordingly, the CRM platform can use the meeting object and participant objects to display meeting information in a user interface, allow users to edit meeting details via the CRM platform, and/or allow users to join the virtual meeting via the CRM platform without separately logging in to the virtual meeting platform.

20 Claims, 7 Drawing Sheets

Related U.S. Application Data

(60) Provisional application No. 63/168,863, filed on Mar. 31, 2021.

(58) Field of Classification Search
USPC .......................................................... 709/204
See application file for complete search history.

(56) References Cited

U.S. PATENT DOCUMENTS

| | | | |
|---|---|---|---|
| 9,307,082 | B2 | 4/2016 | Mondri et al. |
| 9,967,403 | B1 | 5/2018 | Narayanaswamy |
| 10,469,662 | B2 | 11/2019 | O'Connor et al. |
| 10,528,922 | B1 | 1/2020 | Narayanaswamy |
| 11,115,226 | B2 | 9/2021 | Wiener et al. |
| 11,172,163 | B1 | 11/2021 | Chau et al. |
| 11,245,789 | B2 | 2/2022 | Karani |
| 2004/0141605 | A1 | 7/2004 | Chen et al. |
| 2004/0230831 | A1 | 11/2004 | Spelman et al. |
| 2007/0174110 | A1 | 7/2007 | Andrews et al. |
| 2011/0099042 | A1* | 4/2011 | Yerkes ................ G06Q 10/109 705/7.19 |
| 2011/0150194 | A1* | 6/2011 | Narayanaswamy .. H04L 65/403 379/93.21 |
| 2013/0110565 | A1 | 5/2013 | Means, Jr. et al. |
| 2015/0058425 | A1 | 2/2015 | Nathan et al. |
| 2016/0019485 | A1 | 1/2016 | Hosabettu et al. |
| 2017/0236097 | A1* | 8/2017 | Smith ................ G06Q 10/1095 705/7.19 |
| 2017/0323273 | A1 | 11/2017 | Meek et al. |
| 2018/0165656 | A1 | 6/2018 | Tessler |
| 2019/0325996 | A1 | 10/2019 | Yelpaala |
| 2020/0228358 | A1 | 7/2020 | Rampton |
| 2020/0380468 | A1 | 12/2020 | Crawford et al. |
| 2022/0321614 | A1 | 10/2022 | Opoku-Agyemang |

OTHER PUBLICATIONS

Zadarma, "Video Conferencing in ZCRM", retrieved at <<https://zadarma.com/en/blog/video-conferencing-ZCRM>>, 2020, 3 pgs.

* cited by examiner

200

New Virtual Meeting

Meeting Information

Host:

Date:

Meeting Purpose:

Start Time:

End Time:

Cancel   Save

FIG. 2

VIRTUAL MEETING INTEGRATION WITH CUSTOMER RELATIONSHIP MANAGEMENT PLATFORM

RELATED APPLICATIONS

This U.S. Patent Applications is a continuation of, and claims priority to, U.S. patent application Ser. No. 17/710,312, filed on Mar. 31, 2022, which claims priority to provisional U.S. Patent Application No. 63/168,863, entitled "VIRTUAL MEETING INTEGRATION WITH CUSTOMER RELATIONSHIP MANAGEMENT PLATFORM," filed on Mar. 31, 2021, the entirety of which is incorporated herein by reference.

TECHNICAL FIELD

The present disclosure relates to virtual meetings held via computing devices, particularly with respect to scheduling and managing virtual meetings via a customer relationship management platform.

BACKGROUND

Virtual meetings have become a useful and convenient alternative to telephone calls or in-person meetings. For example, when an agent of a business and a customer of the business are unable to meet in person due to scheduling issues, transportation issues, health concerns, or other reasons, the agent and the customer may meet via a virtual meeting conducted over the Internet.

Businesses may also use customer relationship management (CRM) platforms to track information about customers, including current customers, past customers, and prospective customers. For example, a CRM platform may track customer account data, sales information associated with sales of products or services to customers, historical contact information indicating when the business has contacted customers in the past, and/or other information associated with customers.

However, existing CRM platforms generally do not include virtual meeting features that enable agents to engage in virtual meetings with customers. Accordingly, if an agent is using a CRM platform to review information about a customer, the agent may need to use other software, separate from the CRM platform, to schedule and hold a virtual meeting with that customer. For instance, while the agent may primarily use the CRM platform throughout his or her workday, the agent may need to switch to another application, web browser tab, window, or other software element on a computing device to schedule and/or hold a virtual meeting with a customer. In some cases, the agent may need to register for a separate account with a virtual meeting platform, and accordingly may need to log into the virtual meeting platform using different login credentials than the agent uses to access the CRM platform. Overall, this process can be cumbersome and/or inconvenient for the agent. Scheduling and managing virtual meetings via separate applications, browser tabs, or other software elements, outside the CRM platform the agent is already using, can also lead to increased usage of memory, processing cycles, and/or other computing resources.

Further, scheduling and managing virtual meetings outside the CRM platform may hinder the ability of the CRM platform to track when the agent communicated with a customer via a virtual meeting, and/or analyze whether the virtual meeting led to sales or other customer metrics tracked by the CRM platform. For example, if the CRM platform is configured to track historical data about communication between the agent and customers, the agent may forget to note in the CRM platform that a virtual meeting with a customer was held outside the CRM platform on a certain date. The CRM platform may therefore lack information about the virtual meeting, and thus be unable to determine that the virtual meeting may have contributed to a later sale to the customer.

The example systems and methods described herein may be directed toward mitigating or overcoming one or more of the deficiencies described above.

SUMMARY

Described herein are systems and methods for scheduling and managing virtual meetings via a CRM platform. The CRM platform may store a meeting object in memory that represents a virtual meeting, as well as one or more participant objects that represent one or more individual participants associated with the virtual meeting. The CRM platform may store data in the meeting object and the one or more participant objects based on user input provided about the virtual meeting and individual participants. The CRM platform may further interact with a separate virtual meeting platform to schedule a virtual meeting room for the virtual meeting, and may store meeting data returned by the virtual meeting platform in the meeting object and/or the one or more participant objects. The CRM platform may also automatically send meeting invitations to invited participants. The CRM platform may further have a user interface that allows users to view and/or edit information about scheduled virtual meetings, and that allows users to join a scheduled virtual meeting hosted by the separate virtual meeting platform directly from the CRM platform. Accordingly, the systems and methods described herein can streamline scheduling and management of virtual meetings by allowing users to schedule and manage virtual meetings via the CRM platform even though the virtual meetings may be hosted by a separate virtual meeting platform.

According to a first aspect, a computer-implemented method can include receiving, by one or more processors associated with a CRM platform, meeting attributes of a virtual meeting, and participant attributes of a participant associated with the virtual meeting. The method can also include generating, by the one or more processors, a meeting object that stores the meeting attributes, wherein the meeting object is a first data object stored in memory associated with the CRM platform. The method can further include generating, by the one or more processors, a participant object that stores the participant attributes, wherein the participant object is a second data object stored in the memory and is associated with the meeting object by the CRM platform. The method can also include transmitting, by the one or more processors, at least one meeting request to a virtual meeting platform, wherein the at least one meeting request includes data from one or more of the meeting object and the participant object. The method can include receiving, by the one or more processors, meeting setup data from the virtual meeting platform in response to the at least one meeting request, and storing, by the one or more processors, elements of the meeting setup data in the meeting object and the participant object. The method can also include causing, by the one or more processors, display of a user interface of the CRM platform associated with the virtual meeting, wherein the user interface is configured to present the meeting attributes based on the meeting object and present the participant attributes based on the participant object. The method can additionally include causing, by the one or more processors, a host device to be redirected from the CRM platform to the virtual meeting platform based on a user instruction to join the virtual meeting received via the user interface.

According to a second aspect, one or more computing devices, associated with a CRM platform, can include one or more processors and memory. The memory can store data objects associated with the CRM platform, including a meeting object configured to store meeting attributes of a virtual meeting, and a participant object configured to store participant attributes of a participant associated with the virtual meeting, wherein the participant object is associated with the meeting object in the CRM platform. The memory can further store computer-executable instructions that, when executed by the one or more processors, cause the one or more computing devices to perform operations. The operations can include transmitting a meeting request to a virtual meeting platform based on the meeting object and the participant object, and receiving meeting setup data from the virtual meeting platform in response to the meeting request. The meeting setup data can include a meeting identifier associated with a virtual meeting room, and a meeting URL associated with the virtual meeting room. The operations can also include storing the meeting identifier in the meeting object, and storing the meeting URL in the participant object. The operations can further include sending an electronic meeting invitation to an email address of the participant stored in the participant object, wherein the electronic meeting invitation includes the meeting attributes based on the meeting object, and the meeting URL based on the participant object. The operations can also include causing the CRM platform to display a user interface that presents the meeting attributes based on the meeting object and presents the participant attributes based on the participant object.

According to a third aspect, one or more non-transitory computer-readable media can store computer-executable instructions associated with a CRM platform that, when executed by one or more processors, cause the one or more processors to perform operations. The operations can include receiving, via the CRM platform, meeting attributes of a virtual meeting and participant attributes of a participant associated with the virtual meeting. The operations can further include storing the meeting attributes, in memory of the CRM platform, in a meeting object, and storing the participant attributes, in the memory of the CRM platform, in a participant object, wherein the participant object is associated with the meeting object by the CRM platform. The operations can also include transmitting a meeting request from the CRM platform to a virtual meeting platform based on the meeting object and the participant object, and receiving meeting setup data from the virtual meeting platform in response to the meeting request. The meeting setup data can include a meeting identifier associated with a virtual meeting room, and a meeting URL associated with the virtual meeting room. The operations can also include storing the meeting identifier in the meeting object, and storing the meeting URL in the participant object. The operations can further include sending an electronic meeting invitation to an email address of the participant stored in the participant object, wherein the electronic meeting invitation includes the meeting attributes based on the meeting object, and the meeting URL based on the participant object. The operations can additionally include causing the CRM platform to display a user interface that presents the meeting attributes based on the meeting object and presents the participant attributes based on the participant object.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 2 shows an example of a meeting setup user interface that can be displayed via the CRM platform.

DETAILED DESCRIPTION

Figure 1:
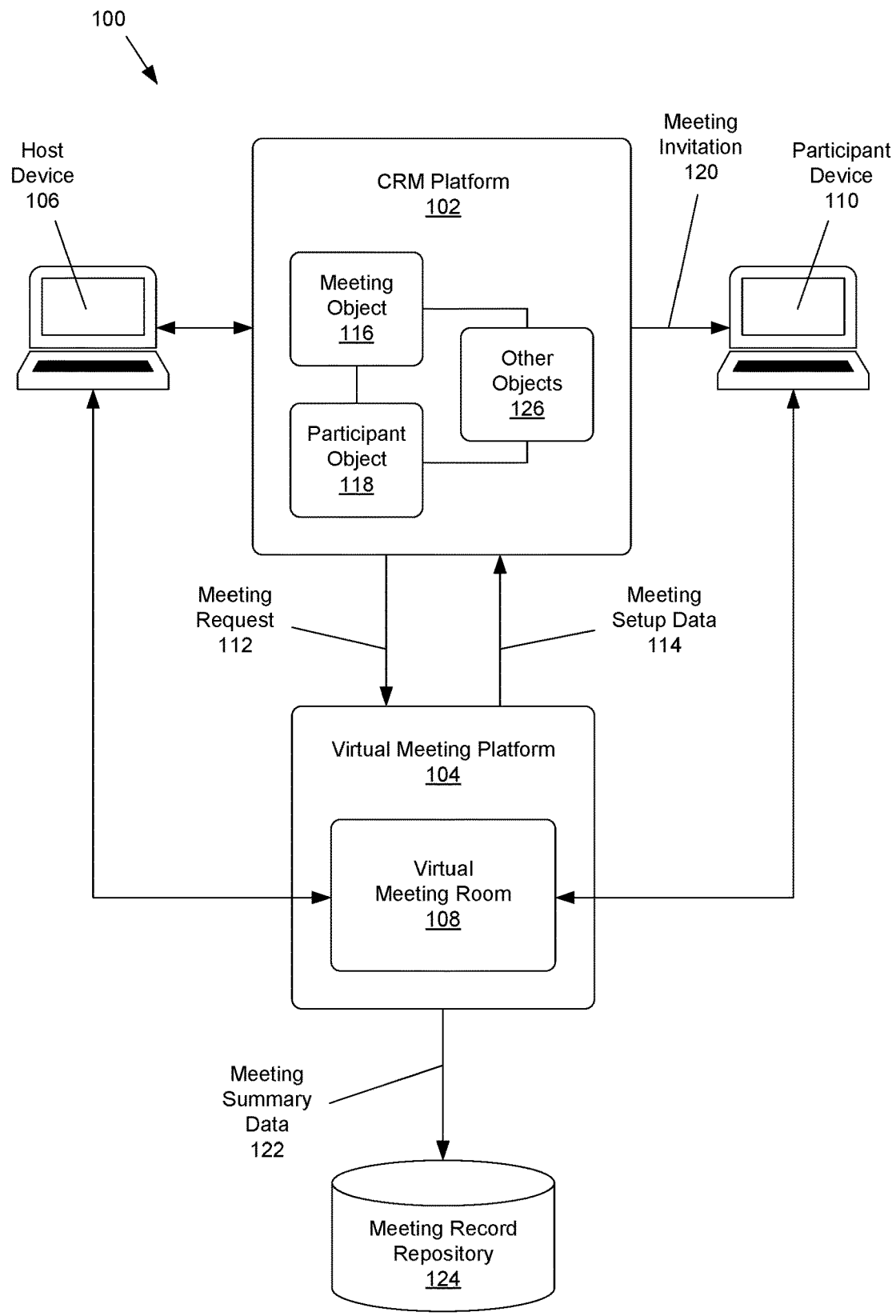
FIG. 1 shows an example of a system that integrates a CRM platform with a virtual meeting platform.

FIG. 1 shows an example of a system 100 that integrates a CRM platform 102 with a virtual meeting platform 104. Integration between the CRM platform 102 and the virtual meeting platform 104 can enable users to use the CRM platform 102 to schedule, manage, and join virtual meetings that are held via the virtual meeting platform 104. In some examples, the CRM platform 102 may track information about scheduled virtual meetings and participants associated with the virtual meetings, and analyze the meeting information in association with other types of customer data tracked by the CRM platform 102.

The CRM platform 102 may be a software application, a cloud-based application or service, or other type of platform that users can access via computing devices, such as the host device 106 shown in FIG. 1. The host device 106 can be a personal computer (PC), such as a laptop, desktop, or workstation, a smart phone, a tablet computer, a personal digital assistant (PDA), another type of mobile device, or any other type of computing or communication device. In some examples, CRM platform 102 can execute via one or more remote servers, and the host device 106 can access the CRM platform 102 via the Internet and/or other data networks. In other examples, the host device 106 may locally execute the CRM platform 102 or access the CRM platform 102 via a local network.

The CRM platform 102 may be configured to store information about customers of a business, including current customers, past customers, and prospective customers. The CRM platform 102 can be configured to store data in memory using data objects. Data objects stored by the CRM platform can have one or more fields, or other data storage elements, that can hold defined types of data. For example, the CRM platform 102 may use various types of data objects to store, in memory, customer account data, sales information associated with sales of products or services to customers, historical contact information indicating when the business has contacted customers in the past, and/or other information associated with customers. As will be described below, the CRM platform can also create and store data objects associated with virtual meetings, and with participants associated with such virtual meetings.

The CRM platform 102 may have a user interface (UI) that can be displayed via the host device 106 and/or other computing devices associated with authorized users of the CRM platform 102. The UI of the CRM platform 102 may allow a user to view and/or edit data stored in one or more data objects. For example, the CRM platform 102 may allow users to view customer information, search for customer information, edit customer information, input new customer information, and/or otherwise interact with customer information stored by the CRM platform 102.

Data objects may be associated with corresponding UI views. Accordingly, information stored in association with particular types of data objects can be input, displayed, edited, and/or otherwise interacted with via one or more UI views that correspond to the data objects. Example UI views associated with data objects are shown with respect to FIGS. 2 and 3A-3C, and are described below with respect to those figures.

The CRM platform 102 may be associated with the virtual meeting platform 104. In some examples, the virtual meeting platform 104 may be separate from the CRM platform 102. For example, the virtual meeting platform 104 may execute on different servers than the CRM platform 102, be operated by a different entity than the CRM platform 102, and/or otherwise be separate from the virtual meeting platform 104. In other examples, the virtual meeting platform 104 may be a component of the CRM platform 102.

The virtual meeting platform 104 may provide and host a virtual meeting room 108 associated with a virtual meeting. The virtual meeting room 108 may allow users who join the virtual meeting to see each other via video captured by respective computing devices of the users, and/or hear each other via audio captured by respective computing devices of the users. In some examples, the virtual meeting room 108 may also allow users to digitally share documents, collaborate on shared documents, share images displayed on screens of their respective computing devices, communicate via text chat, and/or engage in other virtual meeting features.

The virtual meeting room 108 for a virtual meeting can be accessible by the host device 106, as well as by computing devices of one or more other participants invited to the virtual meeting. For example, the host device 106 and a participant device 110 can both access the virtual meeting room 108. Users of the devices, such that a host that operates the host device 106 and a participant that operates the participant device 110, can accordingly attend the virtual meeting by accessing the virtual meeting room 108 via their respective devices. Similar to the host device 106, the participant device 110 can be a PC, a smart phone, a tablet computer, a PDA, another type of mobile device, or any other type of computing or communication device. In some examples, the virtual meeting platform 104 may provide the virtual meeting room 108 via one or more web pages, such that the host device 106 and the participant device 110 may use web browsers to access the virtual meeting room 108 via the Internet. Although only one participant device 110 is shown in FIG. 1, different participants may use different participant devices to access the same virtual meeting room in situations in which a host invites multiple other participants to a virtual meeting.

In some examples, a participant may be a customer or prospective customer of the host associated with the host device 106. The host associated with the host device 106 may use the CRM platform 102 to track customer information over time as described above. The host may use the CRM platform 102 to invite one or more customers as participants to a virtual meeting. For instance, a host who is an insurance agent may invite a husband and wife as two different participants to a single virtual meeting, so that the host may discuss available insurance options with the husband and wife together if both individuals are using different participant devices. In other examples, a participant may be an associate, partner, or other party associated with the host. For example, if a first participant speaks Spanish and the host does not speak Spanish, the host may invite a Spanish-language translator as a second participant to a virtual meeting that has been scheduled with the first participant. As another example, if the host specializes in selling certain products or services, the host may invite a partner or affiliate who specializes in different products or services as an additional participant to a virtual meeting that has been scheduled with one or more customers.

The host device 106, or another computing device authorized to access the CRM platform 102, may schedule a virtual meeting via the CRM platform 102. For example, if a virtual meeting is to be scheduled between a host and one or more other participants, the host may use the host device 106 to provide attributes of the virtual meeting to the CRM platform 102. Alternatively, another user associated with the host, such as an assistant or other staff member associated with the host, may log in to the CRM platform 102 via the host device 106 or another computing device, and provide user input associated with a virtual meeting.

For instance, a host, or another user associated with the host, may provide user input to the CRM platform 102 indicating a date for a virtual meeting, a start time for the virtual meeting, a duration and/or an end time for the virtual meeting, an indication of the purpose of the virtual meeting, and/or any other details or attributes associated with the virtual meeting. The user may use a UI of the CRM platform 102 to provide virtual meeting attributes, such as the meeting setup UI 200 shown and described below with respect to FIG. 2. The user may also use a UI of the CRM platform 102 to provide user input indicating information about one or more participants, different from the host, to be invited to the virtual meeting. The user may also use a UI of the CRM platform 102 to view information about the virtual meeting, edit attributes of the virtual meeting, and/or add participants to the virtual meeting, for example as shown and described below with respect to FIGS. 3A-3C.

As a non-limiting example, the host device 106 may be associated with an insurance agent who uses the CRM platform 102 to track information about customers and/or prospective customers, such as current insurance policyholders, prospective customers the insurance agent has previously contacted about potentially purchasing insurance policies, and/or prospective customers the insurance agent plans to contact about potentially purchasing insurance policies. In this example, the insurance agent, or a member of the insurance agent's staff, may access the CRM platform 102 via the host device 106 or another computing device, and provide user input to the CRM platform 102 associated with a new virtual meeting with a particular customer.

The CRM platform 102 can be configured to send a meeting request 112 associated with a virtual meeting to the virtual meeting platform 104, based on virtual meeting attributes provided by a user to the CRM platform 102. For example, the meeting request 112 may indicate a date, time, duration, participant information, and/or other attributes of a virtual meeting, based on user input provided to the CRM platform 102.

The virtual meeting platform 104 may create the virtual meeting room 108, or schedule the virtual meeting room 108 to be created before the requested start time of the virtual meeting, in response to the meeting request 112. The virtual meeting platform 104 may assign one or more virtual meeting identifiers to the created or scheduled virtual meeting room 108, such as a meeting identifier, a room identifier, or a session identifier. Virtual meeting identifiers may be names, numbers, strings of alphanumeric characters, or any other types of identifiers.

The virtual meeting platform 104 may return meeting setup data 114 associated with the virtual meeting room 108 to the CRM platform 102, in response to the meeting request 112. For example, the meeting setup data 114 may indicate a virtual meeting identifier assigned by the virtual meeting platform 104 to the virtual meeting room 108.

In some examples, the meeting request 112 and/or the meeting setup data 114 can be exchanged between the CRM platform 102 and the virtual meeting platform 104 using at least one Application Programming Interface (API) associated with the virtual meeting platform 104. For example, the meeting request 112 can be sent by the CRM platform 102 using an API call associated with the virtual meeting platform 104 that has been defined for the scheduling of new virtual meetings.

As will be discussed below, the CRM platform 102 may also send a similar meeting request to the virtual meeting platform 104 using the same type of API call, or a different type of API call, to update a previously-scheduled virtual meeting. For instance, after a virtual meeting has been scheduled according to a first meeting request, the CRM platform 102 may later use an update API to send a second meeting request to the virtual meeting platform 104. The second meeting request may be a request to change attributes of a previously scheduled virtual meeting. For instance, the second meeting request may request that a date or time associated with the scheduled virtual meeting be changed, request that participants be added or removed from the scheduled virtual meeting, and/or request that any other details about the scheduled virtual meeting be changed. The CRM platform 102 may send any number of meeting requests to the virtual meeting platform 104 to schedule new virtual meetings and/or change attributes of scheduled virtual meetings. The virtual meeting platform 104 may respond to such meeting requests by returning corresponding meeting setup data 114 to the CRM platform 102 to confirm that requested virtual meetings have been scheduled, or that changes have been made to previously scheduled virtual meetings.

As discussed above, the CRM platform 102 can be configured to store data in memory using data objects. Some of these data objects can be associated with virtual meetings, including meeting objects and participant objects. For instance, a meeting object 116 may store data about a particular virtual meeting that is the process of being scheduled, or that has been scheduled. A participant object 118 may store data about a particular participant who has been, or will be, invited to the virtual meeting represented by the meeting object 116. Although only one participant object is shown in FIG. 1, the CRM platform 102 may use distinct participant objects to represent distinct participants associated with the same virtual meeting. For example, if the meeting object 116 represents a particular virtual meeting, and three participants are invited to that virtual meeting, the CRM platform 102 can create three distinct participant objects that correspond with the three respective participants.

The CRM platform 102 can link the meeting object 116 with the participant object 118 to indicate that the participant represented by the participant object 118 has been, or will be, invited to the virtual meeting represented by the meeting object 116. For example, the CRM platform 102 may have unique object identifiers for each data object. The CRM platform 102 can accordingly store an object identifier of the participant object 118 in the meeting object 116, and/or store an object identifier of the meeting object 116 in the participant object 118, to reflect the relationship between the meeting object 116 and the participant object 118. In other examples, the CRM platform 102 can store other types of information about relationships between two or more data objects, such as mapping tables, data objects or other data structures that store relationship information, and/or other types of relationship data.

In some situations, there may be a one-to-one relationship between a meeting object and a participant object. For example, if only one participant is associated with a virtual meeting represented by the meeting object 116, and that participant is represented by the participant object 118, the CRM platform may indicate that the meeting object 116 is linked to the participant object 118 via a one-to-one relationship.

However, in other situations, there may be a one-to-many relationship between a single meeting object and multiple participant objects. For instance, if multiple participants, beyond a host, are associated with a virtual meeting, the CRM platform 102 can create and store a different participant object for each participant. Each of the different participant objects can be linked to the same meeting object in the CRM platform 102. As a non-limiting example, if a host invites three other participants to a single virtual meeting represented by meeting object 116, the CRM platform 102 may create three different participant objects, and store data associated with each of the three participants in different participant objects. The CRM platform 102 may link the three different participant objects to meeting object 116. Accordingly, the links between the meeting object 116 and the three participant objects can indicate that the three participants represented by the three participant objects are associated with to the virtual meeting represented by the meeting object 116.

Accordingly, the CRM platform 102 can use the meeting object 116 and at least one participant object 118 to store information about a particular virtual meeting. Data stored in the meeting object 116 and the at least one participant object 118 may be derived from direct user input about the meeting provided by a user to the CRM platform 102 as discussed above, and/or be derived from the meeting setup data 114 returned from the virtual meeting platform 104.

The meeting object 116 may represent the virtual meeting. The meeting object 116 may store data about the date of the virtual meeting, start and/or end times of the virtual meeting, a duration of the virtual meeting, a purpose of the virtual meeting, and/or other attributes of the virtual meeting that may have been provided to the CRM platform 102 as user input from the host device 106 or another computing device. The meeting object 116 may also store other data about the virtual meeting provided by the virtual meeting platform 104, such as a virtual meeting identifier included in the meeting setup data 114. In some examples, the meeting object 116 may also store other types of information about the virtual meeting, such as status information indicating whether setup of the virtual meeting is complete or is still in progress.

A participant object, such as the participant object 118, may represent a particular participant to a virtual meeting. The participant object may store data about attributes of the participant, such as the participant's name, email address, and/or other information about the participant. Such participant information may have been provided to the CRM platform 102 as user input from the host device 106 or other computing device.

In some examples, a participant object may also include information provided to the CRM platform 102, by the virtual meeting platform 104, in meeting setup data 114. For example, the virtual meeting platform 104 may be configured to generate a unique Uniform Resource Locator (URL) for each participant to the same virtual meeting. Accordingly, each participant to the virtual meeting can use a different unique URL to access the same virtual meeting room 108. Having a unique URL for each participant can enable the virtual meeting platform 104 to track which participants have joined the virtual meeting based on which URLs users use to join the virtual meeting. For example, if a user uses a particular unique URL to join the virtual meeting, the virtual meeting platform 104 may prevent any other user from using that same particular unique URL to join the virtual meeting. Having a unique URL for each participant may accordingly enhance security and/or privacy of the virtual meeting, as participant URLs for the virtual meeting may not be able to be shared or used by multiple participants. Having a unique URL for each participant may also be convenient and user-friendly for participants. For example, because unique URLs can be specific to individual participants, participants who use such unique URLs can be logged in to the virtual meeting room 108 directly without establishing an account with the virtual meeting platform 104 or having to enter user credentials upon joining the virtual meeting. In these examples, the meeting setup data 114 may include a unique URL for each participant, and the CRM platform 102 can store the unique URL for each participant in corresponding participant objects.

As noted above, the CRM platform 102 may send multiple meeting requests to the virtual meeting platform 104 associated with a particular virtual meeting. For example, if a user uses the CRM platform 102 to edit a time or date of a scheduled virtual meeting, or otherwise edits information about a scheduled virtual meeting, the CRM platform 102 may store edited attributes of the virtual meeting in the meeting object 116, and may send a new meeting request to the virtual meeting platform 104. The new meeting request can include the previously-determined virtual meeting identifier associated with the virtual meeting, and the newly-edited attributes of the virtual meeting. The new meeting request can be a meeting update request, and can accordingly cause the virtual meeting platform 104 to adjust the scheduling and/or configuration of the virtual meeting, and/or virtual meeting room 108, associated with the previously-determined virtual meeting identifier based on the newly-edited attributes. In this example, the virtual meeting platform 104 may return additional meeting setup data to the CRM platform 102 confirming the changes to the virtual meeting.

As another example, if a user uses the CRM platform 102 to add a new participant to a scheduled virtual meeting, the CRM platform 102 may send another meeting request to the virtual meeting platform 104 to add the new participant. The meeting request may be a meeting update request, or new participant request, that includes the previously-determined virtual meeting identifier associated with the virtual meeting and includes information about the added participant, or otherwise indicates that a new participant is to be added to the virtual meeting. In this example, the virtual meeting platform 104 may return additional meeting setup data to the CRM platform 102 confirming that the additional participant has been added to the virtual meeting. In examples in which the virtual meeting platform 104 provides a unique URL for each participant to a virtual meeting, the meeting setup data returned by the virtual meeting platform 104 can include a new unique URL that the added participant can use to access the virtual meeting, and the CRM platform 102 can store the new unique URL in a participant object associated with the newly added participant.

After the CRM platform 102 has created a participant object for a participant, and has received meeting setup data 114 for a scheduled virtual meeting associated with the participant from the virtual meeting platform 104, the CRM platform 102 can be configured to generate and send a meeting invitation 120 to an email account, telephone number, and/or other type of contact information associated with the participant. In some examples, the CRM platform 102 can use an email address or other contact information associated with the participant, stored in the participant object 118, to address and send the meeting invitation 120. For instance, the meeting invitation 120 may be an automatically-generated email, text message, or other notification, which the participant may receive via the participant device 110.

The meeting invitation 120 may include information about the scheduled virtual meeting, based on information in a meeting object 116 and/or the participant object 118. For example, the meeting invitation 120 may include predefined text and/or images based on a template, a description of the virtual meeting based on meeting purpose information stored in the meeting object 116, a time and date of the scheduled virtual meeting based on information stored in the meeting object 116, and/or a URL associated with the virtual meeting room 108. The participant may accordingly use the participant device 110 to access the virtual meeting room 108 at the date and time of the scheduled virtual meeting, based on information provided in the meeting invitation 120.

In examples in which the virtual meeting platform 104 provides a unique URL for the scheduled virtual meeting for each participant, the unique URL for the participant may be stored in a corresponding participant object in the CRM platform 102 based on the meeting setup data 114 returned from the virtual meeting platform 104. The CRM platform 102 can obtain the unique URL provided, by the virtual meeting platform 104, for the participant from the participant object, and can include the unique URL in the meeting invitation 120. The participant can accordingly use the unique URL, included in the meeting invitation 120, to access the virtual meeting room 108 via a participant device.

In some examples, the meeting invitation 120 may be formatted with text, images, and/or other indicia associated with a business or company that is affiliated with the host. For example, the meeting invitation 120 can be an email that includes colors, logos, or other indicia associated with the host's company or business, rather than indicia associated with the CRM platform 102 or the virtual meeting platform 104. The virtual meeting platform 104 may similarly be configured to present the virtual meeting room 108 using colors, logos, or other indicia associated with the host's company or business, rather than indicia associated with the CRM platform 102 or the virtual meeting platform 104. As a non-limiting example, if the host is an insurance agent affiliated with an insurance company, the meeting invitation 120 and/or the virtual meeting room 108 may be branded with indicia of the insurance company, instead of indicia associated with other entities that may own or operate the CRM platform 102 and/or the virtual meeting platform 104.

In some examples, if a user of the CRM platform 102 edits information about the virtual meeting, for instance to change a date or time of the virtual meeting, the CRM platform 102 may be configured to store the edited attributes in the meeting object 116, and may send an updated meeting request to provide the edited attributes the virtual meeting platform 104. The virtual meeting platform 104 may return updated meeting setup data 114 to the CRM platform 102 to confirm the changes to the virtual meeting. The CRM platform 102 may also send a new meeting invitation to each participant associated with the virtual meeting. A new meeting invitation may inform a participant of a new date or time of the virtual meeting, or other edited attributes of the virtual meeting.

In addition to automatically sending a meeting invitation 120 for each participant, in some examples the CRM platform 102 may automatically add a calendar entry associated with the virtual meeting to a digital calendar associated with the host, and/or send a similar meeting invitation to an email account, telephone number, and/or other type of contact information associated with the host. As a non-limiting example, when the host or another user associated with the host schedules a virtual meeting via the CRM platform 102, the CRM platform 102 may be configured to automatically add the virtual meeting to the host's calendar in Microsoft® Outlook® or another digital calendar.

In some examples, although the meeting invitation 120 provided to a participant may include a URL that the participant can use to directly access the virtual meeting room 108, a similar meeting invitation or calendar entry provided to the host may include a different URL or other link to the CRM platform 102 instead of the virtual meeting room 108. The link provided to the host, via a meeting invitation and/or a calendar entry, may enable the host to use host device 106 to access the CRM platform 102 and view information about the virtual meeting, and/or initiate or join the virtual meeting via user input provided to the CRM platform 102. For example, clicking the link may cause the host device 106 to load a UI view in the CRM platform 102 that is associated with the meeting object 116, such that the host can view details about the virtual meeting as shown and described further below with respect to FIGS. 3A-3C.

The host may initiate or join the virtual meeting via the CRM platform 102. For example, the host may log in to the CRM platform 102 via the host device 106 using credentials associated with the CRM platform 102. The host may navigate to a UI view of the CRM platform 102 that displays information about the virtual meeting, as shown and described further below with respect to FIGS. 3A-3C. The UI view may have button, link, or other selectable UI element that, if selected, causes the CRM platform 102 to redirect the host device 106 to a web page associated with the virtual meeting room 108. In some example, the redirection may cause the host device 106 to navigate away from a web page associated with the CRM platform 102 to another web page associated with the virtual meeting room 108. In other examples, the redirection may cause the host device 106 to open the web page associated with the virtual meeting room 108 in a new browser tab or window, such that the CRM platform 102 remains accessible in another browser tab or window during the virtual meeting.

In some examples, the CRM platform 102 may automatically provide host credentials associated with the host to an intermediate authentication platform (not shown), which can validate the host credentials and redirect the host device 106 to the virtual meeting room 108. Accordingly, because the host is already logged into the CRM platform 102, the host can access the virtual meeting room 108 without having to re-enter credentials or manually provide different credentials to the virtual meeting platform 104 when the virtual meeting begins. The CRM platform 102 can thus provide a single sign-on (SSO) experience for the host, even though the host ultimately engages in the virtual meeting via the virtual meeting platform 104 separately from the CRM platform 102.

For example, when the host selects an option to join the virtual meeting in the CRM platform 102 via a web browser on the host device 106, the CRM platform 102 can call an intermediate authentication platform that is configured to perform Security Assertion Markup Language (SAML) assertion associated with the virtual meeting platform 104. The CRM platform 102 may provide a username and/or other login credentials associated with the host to the intermediate authentication platform. In some examples, the login credentials may be the same login credentials the host uses to log in to the CRM platform 102. In other examples, the login credentials may be specific to the virtual meeting platform 104, but be stored by the CRM platform 102 such that the host does not need to re-enter the login credentials upon selecting the join meeting option. The CRM platform 102 may also provide a virtual meeting identifier and/or other information associated with the virtual meeting to the intermediate authentication platform. If the intermediate authentication platform validates the credentials provided by the CRM platform 102, the intermediate authentication platform may redirect a web browser of the host device 106 to a web page associated with the virtual meeting room 108.

As the host and one or more participants engage in the virtual meeting via the virtual meeting room 108, the virtual meeting platform 104 may collect data about the virtual meeting. For example, the virtual meeting platform 104 may log when the host and/or one or more participants logged in to the virtual meeting, log whether individuals did or did not log in to the virtual meeting, track an actual duration of the virtual meeting from start to finish, store copies of documents shared during the virtual meeting, create recordings of the virtual meeting, and/or otherwise collect data about the virtual meeting. After the conclusion of the virtual meeting, the virtual meeting platform 104 may transmit meeting summary data 122, including the data collected by the virtual meeting platform 104 about the virtual meeting, to a meeting record repository 124 associated with the host. The virtual meeting platform 104 may also close the virtual meeting room 108 and purge the collected data about the virtual meeting from memory associated with the virtual meeting platform 104.

In some examples, the meeting record repository 124 may be separate from the CRM platform 102. For instance, in examples in which the host is an insurance agent associated with an insurance company, the virtual meeting platform 104 may transmit the meeting summary data 122 to one or more servers associated with the insurance company, where the meeting summary data 122 can be stored for archival purposes, electronic discovery purposes, later analysis by other users associated with the insurance company, and/or for any other reason. In other examples, the virtual meeting platform 104 may also, or alternately, provide at least some meeting summary data 122 to the CRM platform 102 after the virtual meeting concludes, such that the CRM platform 102 can update the meeting object 116, participant objects, and/or other objects 126 based on the meeting summary data 122.

As shown in FIG. 1, in some examples, the CRM platform 102 may also store other objects 126 in addition to meeting objects and participant objects. Other objects 126 may be data objects that relate to other types of data, beyond meeting information, that can be tracked by the CRM platform 102. For example, one or more other objects 126 may store data about customer accounts, customer purchase histories, current and/or past sales opportunities associated with customers or prospective customers, communications histories associated with customers, and/or other types of data. In some examples, one or more other objects 126 may be linked to a meeting object, and/or to one or more participant objects linked to a meeting object.

The CRM platform 102 may link one or more other objects 126 to a meeting object and/or one or more participant objects, before and/or after a virtual meeting. As discussed above, the participant object 118 may store information about a particular participant associated with a virtual meeting, including the participant's name and/or a unique URL provided by the virtual meeting platform 104 that the participant can use to access the virtual meeting room 108. However, the CRM platform 102 may link the participant object 118 to one or more other objects 126 associated with the participant. For example, the CRM platform 102 may link the participant object 118 to another data object representing a customer account associated with the participant, data objects representing current or past sales opportunities associated with the participant, data objects representing previous communications between the host and the participant, and/or other types of data objects representing any other data associated with the participant that is tracked by the CRM platform 102.

Linking other objects 126 to meeting objects and/or participant objects can enable the CRM platform 102 to display information about scheduled virtual meetings in UI views associated with the other objects 126. For example, a user of the CRM platform 102 may navigate to a UI view that displays information about a customer account based on one or more other objects 126 associated with that customer account. If one or more of the other objects 126 are linked to a participant object 118 and/or a meeting object 116 associated with a scheduled virtual meeting, the CRM platform 102 may display information about the scheduled virtual meeting alongside other information about the customer account. Accordingly, as a user views a customer account page associated with a particular customer account in the CRM platform 102, the customer account page may indicate that a virtual meeting associated with the customer account has been scheduled. The user may be able to click on, or otherwise select, the virtual meeting information in the customer account page, and be redirected to a different UI view that displays information about the scheduled virtual meeting, for instance as shown and described below with respect to FIGS. 3A-3C.

In some examples, the CRM platform 102 may be configured to determine trends, key performance indicators (KPIs), business metrics, and/or other analytics by analyzing information stored in meeting objects, participant objects, and/or other objects 126 that are related to one another in the CRM platform 102. For example, the CRM platform 102 may determine from one or more other objects 126 that a particular customer purchased an insurance policy in association with a particular sales opportunity tracked by the CRM platform 102. The CRM platform 102 may also determine, based on a meeting object and a participant object associated with the particular customer, that an insurance agent engaged in a virtual meeting with the particular customer two days before the customer purchased the insurance policy. The CRM platform 102 may be configured to determine, based on the meeting object, participant object, and other objects 126, that the virtual meeting contributed to the sale of the insurance policy.

Although FIG. 1 shows a single meeting object, the CRM platform 102 may create and store multiple meeting objects. Each meeting object may be associated with a different virtual meeting that is in the process of being scheduled, has been scheduled for a future time, and/or has been held in the past. For example, if a host schedules five virtual meetings during a week, the CRM platform 102 may create and store five meeting objects that correspond to those five virtual meetings.

In some examples, the CRM platform 102 may continue to store meeting objects, participant objects, and/or other objects 126 for at least at threshold period of time after corresponding virtual meetings have concluded. For instance, if a host holds a virtual meeting represented by meeting object 116 on April 15, the CRM platform 102 may continue to store the meeting object 116 and corresponding participant objects for weeks, months, years, or any other threshold period of time after April 15. Accordingly, the CRM platform 102 may use meeting objects, participant objects, and/or corresponding other objects 126 to determine when previous virtual meetings were held, to determine which participants were invited to previous virtual meetings, to determine if previous virtual meetings led to sales or changes to customer accounts, to determine other KPIs, trends, or business metrics associated with previously virtual meetings, and/or to perform other types of analysis associated with previous virtual meetings.

In some examples, elements of the CRM platform 102 that create and manage meeting objects and participant objects, and interface with the virtual meeting platform 104, may be provided as integrated part of a larger CRM platform that uses other objects 126 to track other types of customer information. In other examples, the elements of the CRM platform 102 that create and manage meeting objects and participant objects, and interface with the virtual meeting platform 104, may be provided as an add-in, plug-in, or other enhancement to another CRM platform that natively uses other objects 126 to track other types of customer information, but does not natively interact with an external virtual meeting platform 104, and/or does not allow users to natively schedule and manage virtual meetings associated with a virtual meeting platform 104. In still other examples, the elements of the CRM platform 102 described herein that create and manage meeting objects and participant objects, and interface with the virtual meeting platform 104, may be provided as a standalone application that may or may not use other objects 126 to track other types of customer information.

Overall, the CRM platform 102 can enable users to schedule and manage virtual meetings that will held via the virtual meeting platform 104 directly through the CRM platform 102. This can be more convenient for users who are already using the CRM platform 102 to track customer information or for other purposes, as the users may not need to separately load the virtual meeting platform 104 in another browser tab or window in order to schedule a new virtual meeting, view information about scheduled virtual meetings, edit information about scheduled virtual meetings, or join scheduled virtual meetings. Accordingly, integration between the CRM platform 102 and the virtual meeting platform 104, including storing information about virtual meetings and associated participants directly within the CRM platform 102 using meeting objects and participant objects, can save time and be more convenient for users of the CRM platform 102. The integration between the CRM platform 102 and the virtual meeting platform 104 described herein can also reduce memory usage, processor cycles, and/or other computing resources, relative to separately scheduling and managing virtual meetings outside the CRM platform 102. For example, the host device 106 can use less memory when scheduling and managing virtual meetings via the CRM platform 102, relative to executing separate browser windows or tabs to access the CRM platform 102 and the virtual meeting platform 104 separately when scheduling and managing virtual meetings.

The meeting objects and participant objects also enable the CRM platform 102 to display information about virtual meetings in a UI of the CRM platform 102, and include links in the UI to other corresponding customer information stored in other objects 126. For example, the links between meeting objects and/or participant objects, and other objects 126, can allow a user of the CRM platform 102 to quickly navigate between scheduling or viewing information about a virtual meeting associated with a customer, and to viewing account data or other information about that customer. Accordingly, links between meeting objects and/or participant objects, and other objects 126, can allow users to schedule and manage virtual meetings in the same CRM platform 102 that the users are using to track other types of customer information. This may also save time and be more convenient for users of the CRM platform 102, and may also reduce memory usage, processor cycles, and/or other computing resources, relative to scheduling and managing virtual meetings via a different application than an application users are already using to track customer information.

FIG. 2 shows an example of a meeting setup UI 200 that can be displayed via the CRM platform 102. The host, or another user associated with the host, can use the meeting setup UI 200 to enter information about a new virtual meeting that is to be scheduled. The meeting setup UI 200 can have fields, selectable options, and/or other UI elements that enable a user to enter information about a new virtual meeting.

In some examples, the CRM platform 102 may have a UI view that shows a list of scheduled virtual meetings, based on corresponding meeting objects. This UI view may have a link that causes the CRM platform 102 to display the meeting setup UI 200 so that a user can provide user input to schedule a new virtual meeting. In other example, the CRM platform 102 may have other UI elements that can lead to display of the meeting setup UI 200. For instance, the CRM platform 102 may have UI interfaces associated with other objects 126 representing current conversations with customers, such as text chats or other types of communications. These UI interfaces may allow users to exchange emails, chat messages, or other communications with customers. However, the UI interfaces may also have a link to the meeting setup UI 200, such that a user who is engaged in a conversation with a customer via a UI interface of the CRM platform 102 can use the meeting setup UI 200 to schedule a new virtual meeting with that customer.

The user can use the meeting setup UI to enter or confirm information about the host of the virtual meeting. In some examples, the host information may be pre-populated in the meeting setup UI 200 based on login credentials that the user used to access the CRM platform 102. For example, if the host has a user account with the CRM platform 102, and logs in using that user account, the CRM platform 102 may pre-populate the host information field in the meeting setup UI 200 with the host's name. In other examples, a user can type in the host information, select host information from a drop-down menu, and/or enter host information in any other way.

The user may also use the meeting setup UI 200 to enter information about a purpose of the virtual meeting. In some examples, the meeting setup UI 200 may have a meeting purpose text field that allows the user to type in a description of the meeting purpose. In other examples, the meeting setup UI 200 may have selectable options, a drop-down menu, and/or any other types of UI elements that enable the user to select between predefined meeting purpose types.

The user may also use the meeting setup UI 200 to enter details about the date, time, and/or duration of the virtual meeting. For example, a user may provide user input defining a date, start time, and end time for the virtual meeting, as shown in FIG. 2. In other example, the user may define a start date and/or end date for the virtual meeting, define a start time and a duration for the virtual meeting, and/or otherwise select date, time, and/or duration information for the virtual meeting. In some examples, the meeting setup UI 200 may have drop-down menus, allow users to select date and/or times based on pre-populated options, and/or have other types of UI elements that enable the user to enter date, time, and/or duration information for the virtual meeting.

The CRM platform 102 may create a meeting object, such as meeting object 116, based on meeting information provided by a user via the meeting setup UI 200. For example, the CRM platform 102 may create the meeting object 116 in memory, and use the meeting object 116 to store host information, meeting purpose information, date, time, or duration information, and/or other virtual meeting attributes entered by a user via the meeting setup UI 200.

In some examples, the meeting setup UI 200 may also have fields, selectable options, and/or other UI elements that enable a user to enter information about one or more participants to the virtual meeting, which the CRM platform 102 can use to create participant objects linked to the meeting object 116. However, in other examples, the meeting setup UI 200 may have fields, selectable options, and/or other UI elements associated with types of data that can be stored in the meeting object 116, and participant information that can be stored in participant objects can be received via other UI views or screens different from the meeting setup UI 200, as discussed further below with respect to FIGS. 3A-3C.

The CRM platform 102 can also use the information provided by the user via the meeting setup UI 200, stored in the meeting object 116, to generate and send the meeting request 112 to the virtual meeting platform 104. For example, the meeting request 112 may indicate host information, meeting purpose information, date, time, or duration information, and/or other virtual meeting attributes that were received by the CRM platform 102 via the meeting setup UI 200. The virtual meeting platform 104 may set up or schedule the virtual meeting room 108 based on the information in the meeting request 112, and return meeting setup data 114 to the CRM platform 102. The meeting setup data 114 may indicate information about the virtual meeting room 108, such as a virtual meeting identifier associated with the virtual meeting room 108. The CRM platform 102 can accordingly add the virtual meeting identifier, and/or other information included in the meeting setup data 114, to the meeting object 116.

In some examples, the CRM platform 102 may send the meeting request 112 once the meeting object 116 has been generated based on user input provided via the meeting setup UI 200. However, in other examples, the CRM platform 102 may store information provided via the meeting setup UI 200 in the meeting object 116, but wait to send the meeting request 112 to the virtual meeting platform 104 until after user input about at least one participant has been received and a corresponding participant object has been generated, as shown and described below with respect to FIGS. 3A-3C.

Figure 3A:
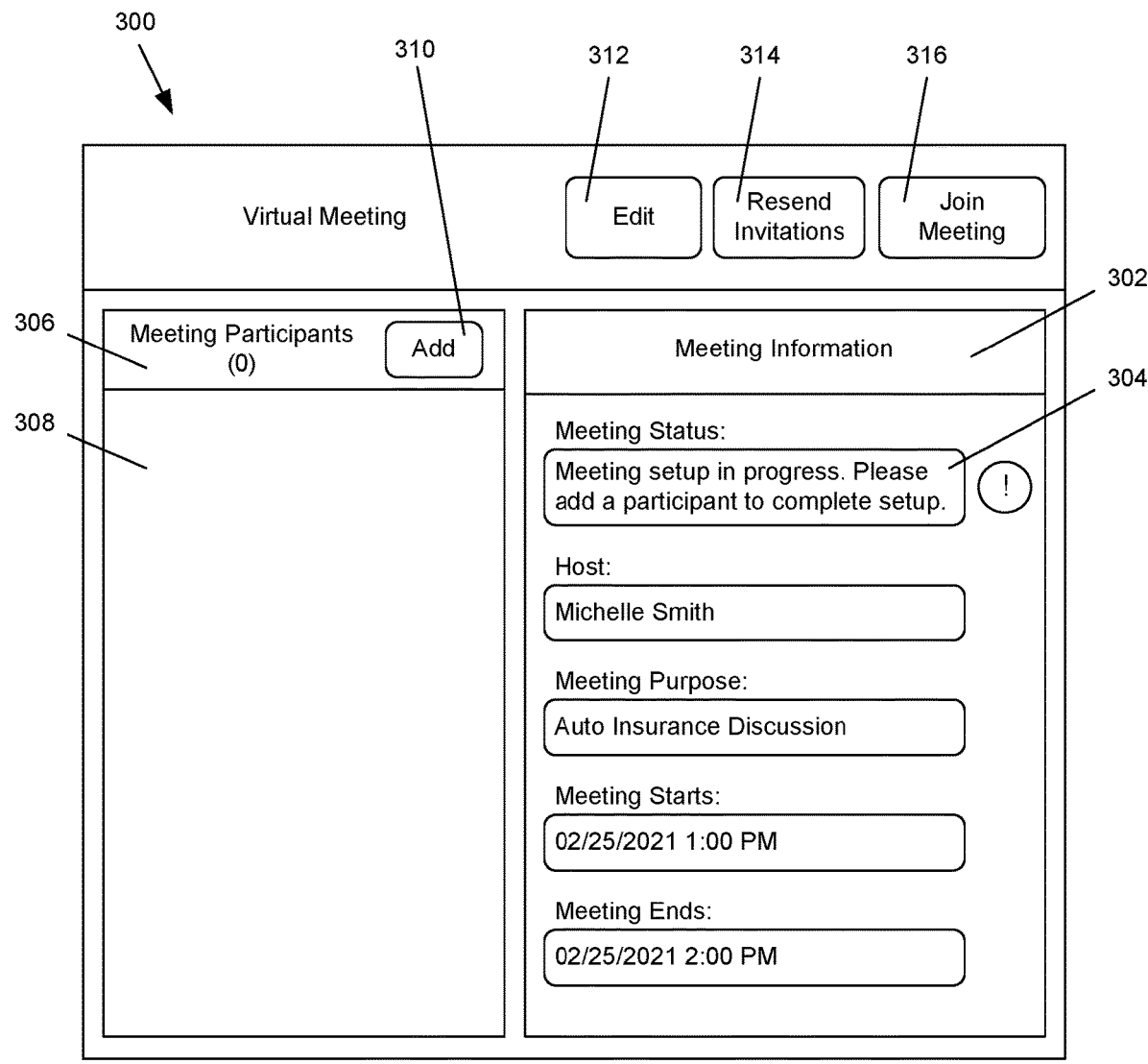
FIGS. 3A-3C show examples of a meeting detail user interface that can be displayed via the CRM platform.
Figure 3B:
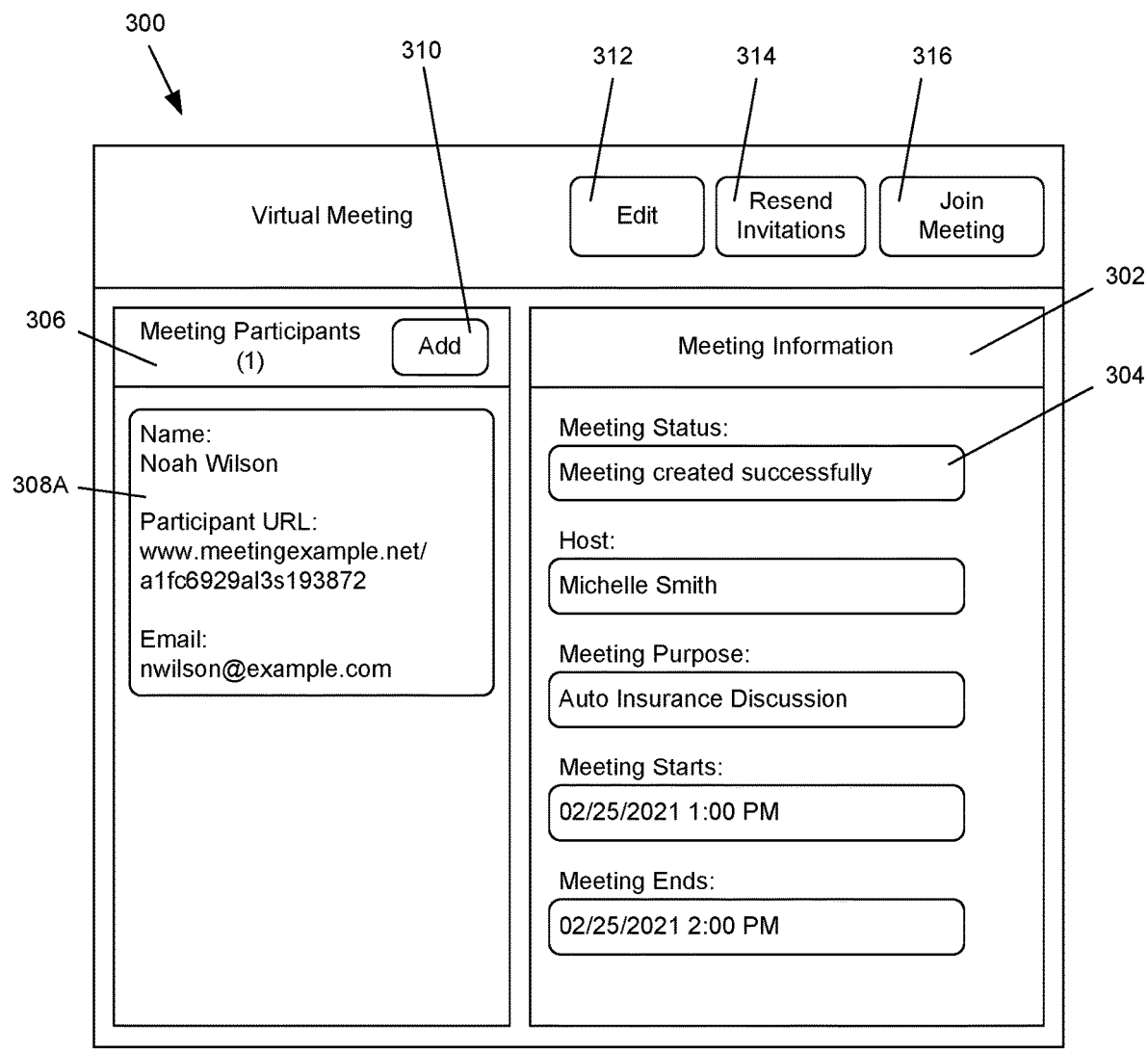
Figure 3C:
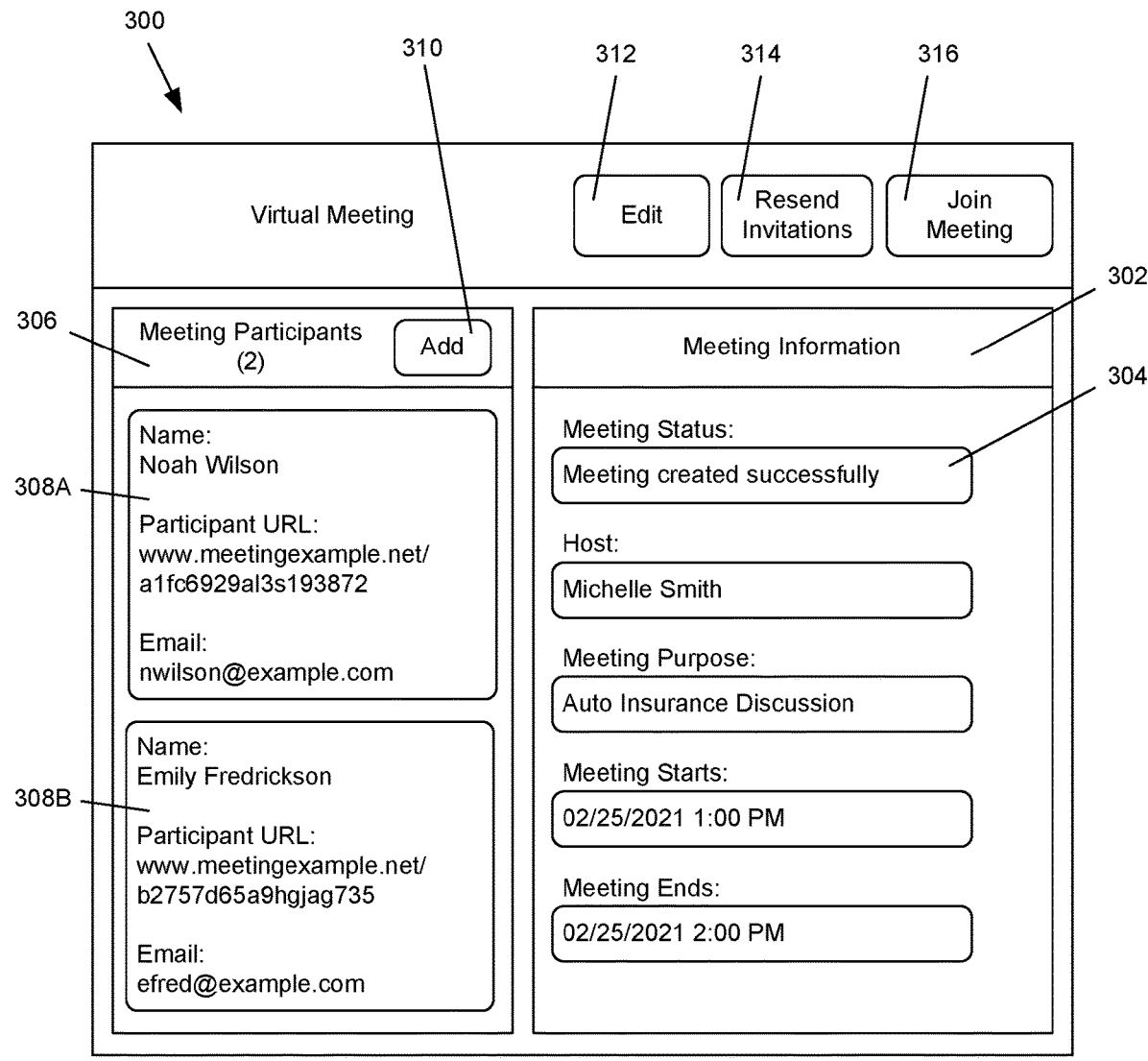

FIGS. 3A-3C show examples of a meeting detail UI 300 that can be displayed via the CRM platform 102. The host, or another user associated with the host, can use the meeting detail UI 300 to view information about a virtual meeting that has been scheduled, or is in the progress of being scheduled. In some examples, the CRM platform 102 can provide the meeting detail UI 300 for a virtual meeting after attributes of the virtual meeting have been received via the meeting setup UI 200 shown in FIG. 2 and the CRM platform 102 has created a corresponding meeting object for the virtual meeting.

The meeting detail UI 300 can include a meeting information section 302. The meeting information section 302 can display information stored in the meeting object the represents the virtual meeting. For example, the meeting information section 302 can display some or all types of information originally provided via the meeting setup UI 200 shown in FIG. 2.

In some examples, the meeting information section 302 may include a meeting status indicator 304. The meeting status indicator 304 can indicate whether setup of the virtual meeting is still in progress, or whether setup of the virtual meeting has been completed. In some examples, setup of the virtual meeting may not be considered complete until information about at least one participant has been received. Accordingly, as shown in FIG. 3A, the meeting status indicator 304 may indicate that meeting setup is still in progress if attributes of the virtual meeting have been received via the meeting setup UI 200, but a user has not yet provided information about any participants for the virtual meeting. However, the meeting status indicator 304 may indicate that the virtual meeting has been created successfully after participant information has been received and corresponding participant objects have been created, as shown in FIGS. 3B and 3C.

The meeting detail UI 300 can include a meeting participant section 306. The meeting participant section 306 can display participant information 308 associated with participants invited to the virtual meeting. The participant information 308 can be based on information stored in corresponding participant objects that are linked to the meeting object that represents the virtual meeting. As shown in FIGS. 3B and 3C, the meeting participant section 306 can display different instances of participant information 308, such as first participant information 308A and second participant information 308B, associated with particular participants associated with the virtual meeting.

However, as shown in FIG. 3A, in some examples the CRM platform 102 may initially display the meeting detail UI 300 after user input about the virtual meeting has been received via the meeting setup UI 200 shown in FIG. 2. At this point, although the CRM platform 102 may have created a meeting object for the virtual meeting, the CRM platform 102 may not yet have received any participant information associated with the virtual meeting, and as such may not yet have created or linked any participant objects to the meeting object. Accordingly, in some examples, the meeting participant section 306 may initially have participant information 308 indicating that zero participants are associated with the virtual meeting, as shown in FIG. 3A.

The meeting participant section 306 may have an add participant UI element 310 that enables users to provide user input about a participant. Selection of the add participant UI element 310 can prompt the CRM platform 102 to display fields, selectable options, and/or other UI elements that enable a user to enter information about a participant to be invited to the virtual meeting. Accordingly, users can search for and/or enter information about a new participant, such as the name of the participant, an email address and/or other contact information for the participant, and/or other attributes of the participant.

In some examples, selection of the add participant UI element 310 may cause the CRM platform 102 to load another UI view, similar to the meeting setup UI 200, with UI elements that enable a user to enter participant information. In other examples, selection of the add participant UI element 310 may cause the CRM platform 102 to display a separate pop-up window, or adjust the meeting participant section 306 or the meeting detail UI 300 overall, to enable users to enter participant information.

When a user provides participant information via the add participant UI element 310, the CRM platform 102 can create and link a corresponding participant object to the meeting object that represents the virtual meeting. For example, the CRM platform 102 can create a new participant object in memory, store the participant information received via the add participant UI element 310 in the participant object, and link the participant object to the meeting object. The CRM platform 102 can also send a meeting request to the virtual meeting platform 104 based on participant information provided by a user via the add participant UI element 310. The CRM platform 102 can also add participant-specific information to the participant object based on meeting setup data returned by the virtual meeting platform 104 in response to the meeting request, such as a participant-specific URL that the participant can use to access the virtual meeting room 108. The CRM platform 102 may also automatically generate and send a meeting invitation based on the information in the participant object. For instance, the CRM platform 102 may also automatically generate and send the meeting invitation 120 to an email address of a participant indicated in the participant object 118, and may include the participant-specific URL stored in the participant object in the meeting invitation 120.

As discussed above, in some examples, the CRM platform 102 may delay sending an initial meeting request to the virtual meeting platform 104 until after meeting information has been received and stored in a meeting object, and until after participant information for at least one participant has been received and stored in a participant object. Accordingly, once a user uses the add participant UI element 310 to provide information about at least one participant to a virtual meeting represented by a meeting object, and stores the participant information in a participant object, the CRM platform 102 can also send an initial meeting request to the virtual meeting platform 104. The initial meeting request may include information about the virtual meeting based on the meeting object, and also include information about the participant based on the participant object. The virtual meeting platform 104 may set up or schedule the virtual meeting room 108 based on the information in the in the meeting request, and return corresponding meeting setup data to the CRM platform 102. The meeting setup data may indicate information about the virtual meeting room 108, such as a virtual meeting identifier associated with the virtual meeting room 108, which the CRM platform 102 can add to the meeting object. The meeting setup data may also include information specific to the participant, such a unique URL the participant can use to access the virtual meeting room 108. The CRM platform 102 can accordingly add the unique URL, and/or other participant information returned in the meeting setup data, to the participant object.

The CRM platform 102 may also update the meeting detail UI 300 based on the added participant information. For example, FIG. 3A shows an example of the meeting detail UI 300 in which the meeting participant section 306 initially indicates zero participants and the meeting status indicator 304 indicates that the that meeting setup is still in progress. However, after a user has provided information about at least a first participant via the add participant UI element 310, and the CRM platform 102 has sent a meeting request to the virtual meeting platform 104 and received corresponding meeting setup data from the virtual meeting platform 104, the CRM platform 102 may update the meeting detail UI 300 as shown in FIG. 3B.

For example, the meeting status indicator 304 in FIG. 3B indicates that that the virtual meeting has been created successfully, because information about at least one participant has been associated with the virtual meeting. The meeting participant section 306 in FIG. 3B also includes first participant information 308A associated with the first participant added to the virtual meeting, and indicates that one participant has been associated with the virtual meeting in addition to the host. The first participant information 308A can be based on data stored in a corresponding participant object. For example, the first participant information 308A indicates a name and an email address associated with the first participant added to the virtual meeting, based on user input about the first participant provided via the add participant UI element 310. The first participant information 308A can also include a unique URL for the first participant, and/or other data specific to the first participant data provided in meeting setup data returned by the virtual meeting platform 104. As discussed above, the CRM platform 102 may automatically send a meeting invitation to the first participant, for instance by sending an email that includes the participant-specific URL indicated in the first participant information 308A to the email address indicated in the first participant information 308A.

Setup of the virtual meeting may be considered complete after at least one participant has been associated with the virtual meeting, as shown in FIG. 3B. However, a user of the CRM platform 102 may choose to invite one or more additional participants to the virtual meeting. Accordingly, the user may use the add participant UI element 310 to input information about a second participant to be invited to the virtual meeting. Such input can cause the CRM platform 102 to create a second participant object linked to the meeting object, send a new or updated meeting request 112 to the virtual meeting platform 104 based on the added second participant, and receive new or updated meeting setup data from the virtual meeting platform 104 based on the addition of the second participant. The CRM platform 102 may accordingly add any participant-specific information in the new or updated meeting setup data to the second participant object for the added second participant. The CRM platform 102 may update the meeting detail UI 300 as shown in FIG. 3C to display second participant information 308B associated with the added second participant, in addition to the first participant information 308A about the previously-added first participant. For example, if the meeting setup data returned by the virtual meeting platform 104 includes a unique URL for each participant, the first participant information 308A and the second participant information 308B may include different participant-specific URLs for the virtual meeting room 108. The CRM platform 102 may also automatically send a meeting invitation to the second participant, for instance by sending an email that includes the participant-specific URL indicated in the second participant information 308B to the email address indicated in the second participant information 308B. Although FIG. 3C shows an example in which two participants have been invited to a virtual meeting, a user of the CRM platform 102 may use the add participant UI element 310 to add any number of participants to a scheduled virtual meeting.

In some examples, participant information 308, such as the first participant information 308A or the second participant information 308B, can include links to other UI views associated with corresponding participants. For example, if the first participant information 308A is based on participant object 118, and participant object 118 is linked to one or more other objects 126 associated with the first participant, a user may be able to click on the participant name displayed in the first participant information 308A to navigate to a different UI view of the CRM platform 102 associated with the first participant. For instance, clicking on the participant name displayed in the first participant information 308A may load a different UI view associated with a customer account of the first participant, where a user of the CRM platform 102 can view account information, communication histories, sales opportunities, and/or other types of data associated with the customer account.

In some examples, a user can use the meeting detail UI 300 to edit information associated with the virtual meeting and/or corresponding participants. For example, the user may use an edit button 312 or other editing features to change information about the virtual meeting and/or one or more participants shown in the meeting detail UI 300, add information about the virtual meeting and/or one or more participants, remove information about the virtual meeting and/or one or more participants, or otherwise edit information stored in the meeting object and/or corresponding participant objects. In some examples, editing meeting information and/or participant information via the meeting detail UI 300 can cause the CRM platform 102 to update a corresponding meeting object and/or participant objects. In some situations, editing meeting information and/or participant information via the meeting detail UI 300 can also cause the CRM platform 102 to send an updated meeting request to the virtual meeting platform 104. For example, if a user edits the date or time of the virtual meeting in the meeting detail UI 300, the updated date or time can be saved in the meeting object 116, and the CRM platform 102 can also use an update API to send an updated meeting request that informs the virtual meeting platform 104 of the updated date or time for the virtual meeting. The virtual meeting platform 104 may return updated meeting setup data 114 to confirm the change to the scheduled virtual meeting. The CRM platform 102 may also be configured to send updated meeting invitations to participants and/or the host based on the changed attributes of the virtual meeting, and/or update a calendar entry associated with the virtual meeting on the host's digital calendar.

The meeting detail UI 300 may have a selectable resend invitations option 314. In some examples, a user may select the resend invitations option 314 to cause the CRM platform 102 to automatically resend meeting invitations, such as meeting invitation 120, to one or more participants. For instance, if the participant calls the host and says they cannot find the original meeting invitation, the host may use the resend invitations option 314 to prompt the CRM platform 102 to resend a copy of the meeting invitation to the participant's email address. In other examples, the resend invitations option 314 may allow the host to copy a unique participant URL indicated in participant information 308, which the host may paste into a manually generated email, text message, or other type of notification.

The meeting detail UI 300 may have a selectable join meeting option 316. Although participants may use URLs, such as participant-unique URLs, sent in meeting invitations to access the virtual meeting room 108, the host of the virtual meeting may access the virtual meeting room 108 by selecting the join meeting option 316 in the meeting detail UI 300 shown via the CRM platform 102. In some examples, a calendar entry for the virtual meeting added to a digital calendar of the host may include a link to the meeting detail UI 300 associated with the virtual meeting in the CRM platform 102. Accordingly, the host may use the host device 106 to navigate to the meeting detail UI 300 associated with the virtual meeting within the CRM platform 102, or click on a link in the calendar entry to automatically load the meeting detail UI 300 associated with the virtual meeting within the CRM platform 102.

The host may select the join meeting option 316 in the meeting detail UI 300 shown via the CRM platform 102. Selection of the join meeting option 316 can cause the CRM platform 102 to initiate a redirection of a web browser of the host device 106 from the CRM platform 102 to a web page for the virtual meeting room 108, for instance in the same or a different web browser or tab. In some examples, selection of the join meeting option 316 can cause the CRM platform 102 to provide stored login credentials associated with the host, a virtual meeting identifier associated with the virtual meeting, and/or other information associated with the virtual meeting to an intermediate authentication platform. The intermediate authentication platform may be configured to perform SAML assertion associated with the virtual meeting platform 104, and redirect the web browser of the host device 106 to a web page for the virtual meeting room 108 if the intermediate authentication platform validates the login credentials provided by the CRM platform 102.

In some examples, the virtual meeting platform 104 may be configured to display a pop-up notification, or any other notification, to the host when the host joins the meeting. For instance, in examples in which the host is an insurance agent, the notification may remind the insurance agent that he or she should not attempt to sell certain types of insurance during the virtual meeting, based on state or federal laws and guidelines, agent licensing credentials, or other factors.

The host and participants can engage in the virtual meeting via the virtual meeting room 108. In some examples, the virtual meeting platform 104 may be configured to display names of the host and/or participants on-screen during the virtual meeting, based on names of the host and/or participants provided by the CRM platform 102 in one or more meeting requests. For example, the virtual meeting platform 104 may be configured to display a name of the first participant during the virtual meeting, based on name information of the first participant provided by the CRM platform 102 to the virtual meeting platform 104. Such name information may have been initially received from a user via the add participant UI element 310, and may have been stored by the CRM platform 102 in a corresponding participant object before being sent to the virtual meeting platform 104.

In some examples, the virtual meeting platform 104 may also be configured to display status information about the host and/or participants during the virtual meeting. For example, the virtual meeting platform 104 may be configured to track which participant-specific URLs have been used by participants to log into the virtual meeting room 108. Accordingly, when the virtual meeting platform 104 determines that a particular participant-specific URL has been used to log into the virtual meeting room 108, the virtual meeting platform 104 may change a status associated with the participant name corresponding to that particular participant-specific URL to indicate that the participant is logged in. The virtual meeting platform 104 may also mark the participant-specific URL as used, and block any other users from accessing the virtual meeting room 108 via that participant-specific URL.

As discussed above, the virtual meeting platform 104 may collect data during the virtual meeting. For example, the virtual meeting platform 104 may times when the host and/or one or more participants logged in to the virtual meeting, log whether individuals did or did not log in to the virtual meeting, track an actual duration of the virtual meeting from start to finish, store copies of documents shared during the virtual meeting, create recordings of the virtual meeting, and/or otherwise collect data about the virtual meeting. After the conclusion of the virtual meeting, the virtual meeting platform 104 may close the virtual meeting room 108, transmit the collected data associated with the virtual meeting to the meeting record repository 124 as meeting summary data 122, and may purge the collected data from memory associated with the virtual meeting platform 104.

Figure 4:
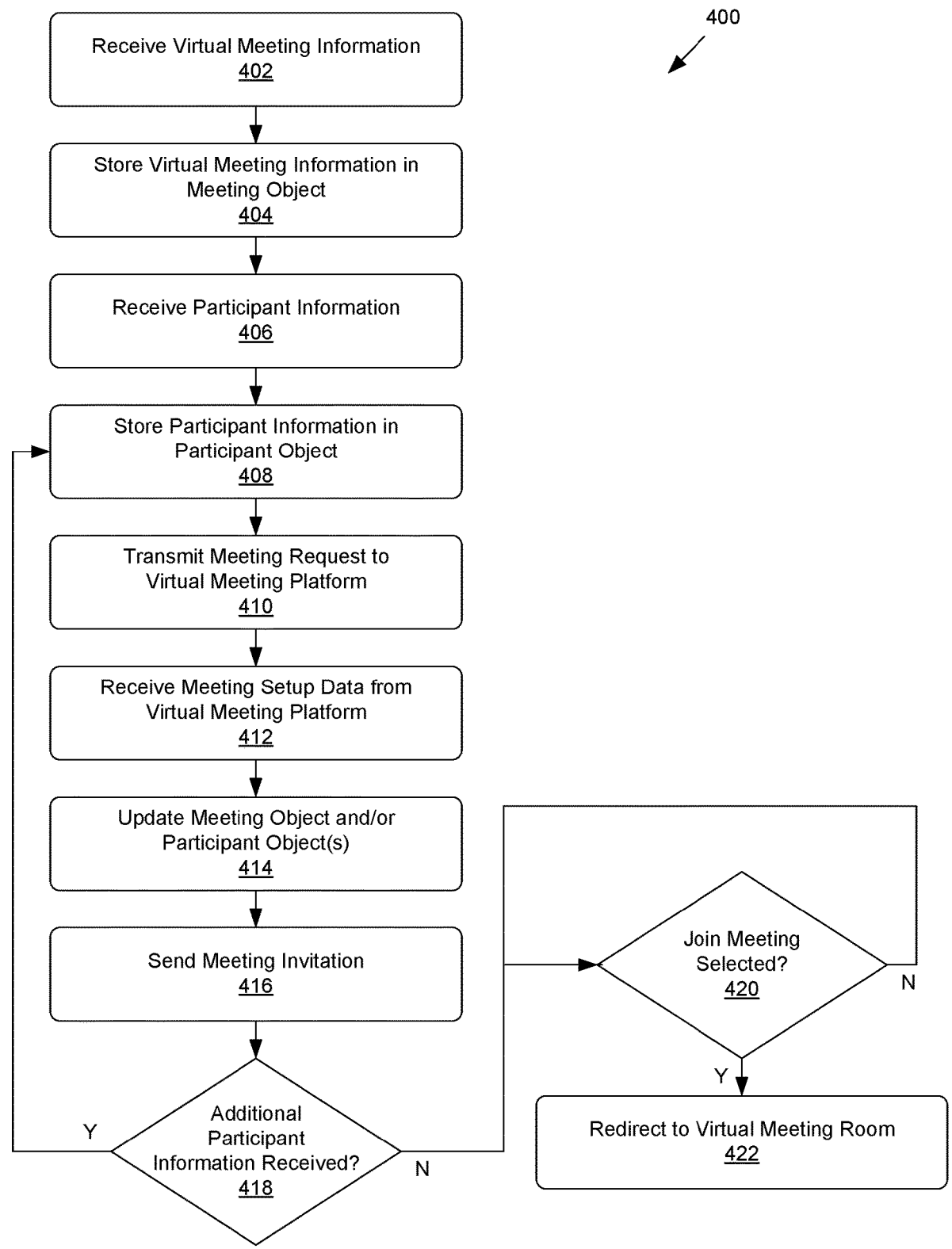
FIG. 4 shows a flowchart of an example process by which the CRM platform can schedule and manage a virtual meeting associated with the virtual meeting platform.

FIG. 4 shows a flowchart of an example process 400 by which the CRM platform 102 can schedule and manage a virtual meeting associated with the virtual meeting platform 104.

At block 402, the CRM platform 102 can receive user input defining information about a new virtual meeting. For example, the CRM platform 102 can display the meeting setup UI 200 described above in response to a user selection of a virtual meeting scheduling option in the CRM platform 102, and a user can provide information about the new virtual meeting via the meeting setup UI 200. In some examples, the CRM platform 102 can validate the user input, and output error messages if the user input cannot be validated. For instance, if a user enters an end time for the virtual meeting that is before the start time entered for the virtual meeting, the CRM platform 102 may display an error message asking the user to correct the start and/or end times for the virtual meeting.

At block 404, the CRM platform 102 can create the meeting object 116 in memory as a data object that represents the new virtual meeting, and that can store the information received at block 402 about the virtual meeting in the meeting object 116. In some examples, the CRM platform 102 can also display the information about the new virtual meeting, stored in the meeting object 116, via the meeting detail UI 300. In some examples, the meeting detail UI 300 may use the meeting status indicator 304 to indicate that setup of the virtual meeting is still in progress, because no participant information has yet been received.

At block 406, the CRM platform 102 can receive user input defining participant information about a new participant to the virtual meeting. For example, the CRM platform 102 can display UI elements that enable a user to provide participant information in response to a user selection of the add participant UI element 310 in the meeting detail UI 300, and a user can provide information about the new participant via those UI elements. In some examples, the CRM platform 102 can validate the user input, and output error messages if the user input cannot be validated. For instance, if a user enters an email address for the participant using an invalid format for the email address, the CRM platform 102 may display an error message asking the user to correct the format of the email address.

At block 408, the CRM platform 102 can create a participant object, such as participant object 118, in memory as a data object that represents the new participant. The CRM platform 102 can also store the information received at block 406 about the participant in the participant object 118.

At block 410, the CRM platform 102 can transmit the meeting request 112 to the virtual meeting platform 104. The meeting request 112 can indicate attributes of the virtual meeting stored in the meeting object 116 at block 404, such as a host identifier, date, time, duration, and/or other attributes of the virtual meeting. The meeting request 112 may also indicate attributes of the participant stored in the participant object 118 at block 408, such as a name of the participant and an email address of the participant.

At block 412, the CRM platform 102 can receive meeting setup data 114 from the virtual meeting platform 104, in response to the meeting request 112 sent at block 410. The meeting setup data 114 may confirm that the virtual meeting platform 104 will provide the virtual meeting room 108 at the date and time indicated in the meeting request 112. The meeting setup data 114 may also include a virtual meeting identifier associated with the virtual meeting room 108, and/or a URL by which the participant can access the virtual meeting room 108. In some examples, URL provided for the participant by the virtual meeting platform 104 may be a unique URL specific to the participant.

At block 414, the CRM platform 102 may update the meeting object 116 and/or the participant object 118 based on the meeting setup data 114 received from the virtual meeting platform 104 at block 412. For example, the CRM platform 102 can add a virtual meeting identifier associated with the virtual meeting room 108 to the meeting object 116 based on the meeting setup data 114, in addition to other information stored in the meeting object 116 based on user input received at block 402. Similarly, the CRM platform 102 can add a participant-specific URL for the virtual meeting room 108 to the participant object 118 based on the meeting setup data 114, in addition to other information stored in the participant object 118 based on user input received at block 406.

At block 416, the CRM platform 102 may generate and send a meeting invitation to an email address, or other contact information, indicated in the participant object 118. The meeting invitation may include the participant-specific URL for the virtual meeting room 108 returned by the virtual meeting platform 104. In some examples, the CRM platform 102 may send a similar meeting invitation to an email address of the host, and/or automatically add a calendar entry for the virtual meeting to a digital calendar associated with the host. The meeting invitation and/or calendar entry provided by the CRM platform 102 for the host may include a link to the meeting detail UI 300, such that the host can later join the virtual meeting by using the link to load the meeting detail UI 300 and then selecting the join meeting option 316 via the meeting detail UI 300 as discussed below with respect to block 422.

In some examples, the CRM platform 102 can also display the meeting detail UI 300, and/or update information shown in the meeting detail UI 300, based on the meeting setup data 114 returned at block 412. For example, the CRM platform 102 may update the meeting status indicator 304 to that that the virtual meeting has been created successfully, and/or update the meeting participant section 306 to include participant information 308 including the participant-specific URL associated with the added participant.

In some examples, the CRM platform 102 may wait to send the meeting request at block 410 until after virtual meeting information has been received and stored at blocks 402 and 404, and until after participant information for at least one participant has been received at blocks 406 and 408. For example, although the CRM platform 102 may display the meeting detail UI 300 after block 406, the meeting detail UI 300 may initially that zero participants have been invited to the virtual meeting as shown at FIG. 3A. At this point, the CRM platform 102 may not yet have sent a meeting request to the virtual meeting platform 104 or received a virtual meeting identifier from the virtual meeting platform 104. However, after receiving and storing information about at least one participant at blocks 406 and 408, the CRM platform 102 may send the meeting request and receive meeting setup data containing a virtual meeting identifier and a participant-specific URL from the virtual meeting platform 104 in return, such that the CRM platform 102 can update the meeting object 116 and the participant object 118 based on the meeting setup data.

However, in other examples, the CRM platform 102 may send an initial meeting setup request to the virtual meeting platform 104 after block 404, based on receiving and storing virtual meeting information at blocks 402 and 404. In these examples, the virtual meeting platform 104 may return a virtual meeting identifier for the virtual meeting in initial meeting setup data, such that the CRM platform 102 can add the virtual meeting identifier to the meeting object 116 even though no participants have yet been added. When participant information is later received and stored at blocks 406 and 408, the CRM platform 102 may send a separate meeting request to the virtual meeting platform that includes the participant information and references the already-received virtual meeting identifier, and the virtual meeting platform 104 may return additional meeting setup data that includes a participant-specific URL that the added participant can use to access the virtual meeting room 108 corresponding to the virtual meeting identifier. Accordingly, the CRM platform 102 can add the participant-specific URL to the participant object 118 based on the additional meeting setup data returned by the virtual meeting platform 104.

At block 418, the CRM platform 102 can determine whether any additional participant information has been received. For example, although setup of the virtual meeting may be considered complete after at least one participant has been added to the virtual meeting, the CRM platform 102 may allow users to also invite any number of additional participants to the virtual meeting. For instance, a user may use the add participant UI element 310 to input information about an additional participant. If such additional participant information has been received (Block 418—Yes), the CRM platform 102 can store the additional participant information in a new participant object at block 408, send a new meeting request based on the additional participant information to the virtual meeting platform 104 at block 410, receive new meeting setup data including a participant-specific URL for the additional participant at block 412, and add the new participant-specific URL for the additional participant to the new participant object at block 418. The CRM platform can repeat blocks 408-418 for any number of additional participants.

However, if no additional participant information is received (Block 418—No), the CRM platform 102 can wait at block 420 until the host selects the join meeting option 316 via the meeting detail UI 300 associated with the virtual meeting. As discussed above, the host may use a link in a meeting invitation and/or calendar entry provided by the CRM platform 102 to load the meeting detail UI 300, or otherwise navigate to the meeting detail UI 300 in the CRM platform 102.

Once the host selects the join meeting option 316 via the host device 106 (Block 420—Yes), the CRM platform 102 can cause the host device 106 to be redirected to a web page for the virtual meeting room 108 at block 422. For example, at block 422 the CRM platform 102 may provide stored login credentials associated with the host, a virtual meeting identifier associated with the virtual meeting, and/or other information associated with the virtual meeting to an intermediate authentication platform. The intermediate authentication platform may be configured to perform SAML assertion associated with the virtual meeting platform 104, and redirect the web browser of the host device 106 to a web page for the virtual meeting room 108 if the intermediate authentication platform validates the login credentials provided by the CRM platform 102. Accordingly, after block 422, the host can engage in the virtual meeting along with any or all of the participants who have also joined the virtual meeting room 108.

The system 100 may implement process 400, and generate and display the meeting setup UI 200 and the meeting detail UI 300, using one or more computing devices. An example system architecture for such a computing device is described below with respect to FIG. 5.

Figure 5:
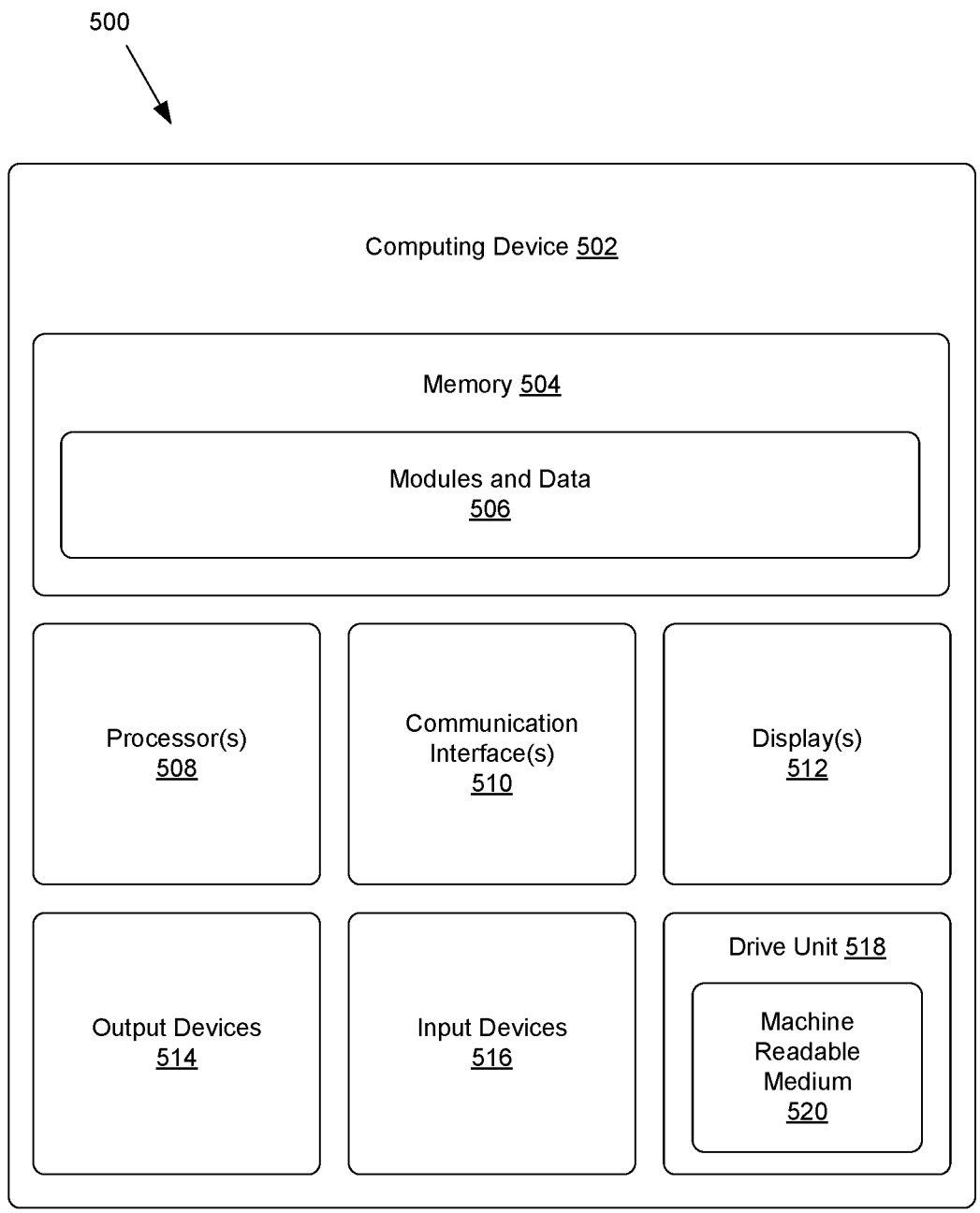
FIG. 5 shows an example system architecture for a computing device associated with the system described herein.

FIG. 5 shows an example system architecture 500 for a computing device 502 associated with the system 100 described herein. The computing device 502 can be a server, computer, or other type of computing device that executes at least a portion of the system 100, such as one or more elements of the CRM platform 102, the virtual meeting platform 104, the host device 106, the participant device 110, or the meeting record repository 124. In some examples, elements of the system 100 can be distributed among, and/or be executed by, multiple computing devices. For instance, elements of the CRM platform 102 can be executed by one or more computing devices, while the virtual meeting platform 104 can be executed by one or more other computing devices. The host device 106, the participant device 110, and/or the meeting record repository 124 can be still further computing devices.

The computing device 502 can include memory 504. In various examples, the memory 504 can include system memory, which may be volatile (such as RAM), non-volatile (such as ROM, flash memory, etc.) or some combination of the two. The memory 504 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information and which can be accessed by the computing device 502. Any such non-transitory computer-readable media may be part of the computing device 502.

The memory 504 can store modules and data 506. In some examples, the modules and data 506 can include data associated with the CRM platform 102, such as meeting objects, participant objects, and/or other objects. The modules and data 506 can also include any other modules and/or data that can be utilized by the computing device 502 to perform or enable performing any other actions. Such other modules and data can include a platform, operating system, and applications, and data utilized by the platform, operating system, and applications.

The computing device 502 can also have processor(s) 508, communication interfaces 510, displays 512, output devices 514, input devices 516, and/or a drive unit 518 including a machine readable medium 520.

In various examples, the processor(s) 508 can be a central processing unit (CPU), a graphics processing unit (GPU), both a CPU and a GPU, or any other type of processing unit. Each of the one or more processor(s) 508 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 508 may also be responsible for executing computer applications stored in the memory 504, which can be associated with common types of volatile (RAM) and/or nonvolatile (ROM) memory.

The communication interfaces 510 can include transceivers, modems, interfaces, antennas, telephone connections, and/or other components that can transmit and/or receive data over networks, telephone lines, or other connections.

The display 512 can be a liquid crystal display or any other type of display commonly used in computing devices. For example, a display 512 may be a touch-sensitive display screen, and can then also act as an input device or keypad, such as for providing a soft-key keyboard, navigation buttons, or any other type of input.

The output devices 514 can include any sort of output devices known in the art, such as a display 512, speakers, a vibrating mechanism, and/or a tactile feedback mechanism. Output devices 514 can also include ports for one or more peripheral devices, such as headphones, peripheral speakers, and/or a peripheral display.

The input devices 516 can include any sort of input devices known in the art. For example, input devices 516 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine readable medium 520 can store one or more sets of instructions, such as software or firmware, that embodies any one or more of the methodologies or functions described herein. The instructions can also reside, completely or at least partially, within the memory 504, processor(s) 508, and/or communication interface(s) 510 during execution thereof by the computing device 502. The memory 504 and the processor(s) 508 also can constitute machine readable media 520.

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A computer-implemented method, comprising:
   receiving, by one or more processors, and via a customer relationship management (CRM) platform, input indicating:
      meeting attributes of a virtual meeting, and
      participant attributes of a participant associated with the virtual meeting;
   generating, by the one or more processors, and based on the input:
      a meeting data object that stores the meeting attributes; and
      a participant data object, linked to the meeting data object, that stores the participant attributes;
   transmitting, by the one or more processors, and to a virtual meeting platform, a meeting request indicating data based on at least one of the meeting data object or the participant data object;
   receiving, by the one or more processors, and from the virtual meeting platform in response to the meeting request, meeting setup data associated with hosting of the virtual meeting by the virtual meeting platform; and
   adjusting, by the one or more processors, at least one of the meeting data object or the participant data object based on the meeting setup data.

2. The computer-implemented method of claim 1, wherein the meeting data object and the participant data object are separate data objects maintained by the CRM platform.

3. The computer-implemented method of claim 1, wherein:
   the meeting setup data indicates a virtual meeting identifier assigned by the virtual meeting platform to the virtual meeting, and
   the one or more processors adjust the meeting data object to indicate the virtual meeting identifier.

4. The computer-implemented method of claim 1, wherein:
   the meeting setup data indicates a Uniform Resource Locator (URL), provided by the virtual meeting platform, associated with the virtual meeting, and
   the one or more processors adjust the participant data object to indicate the URL.

5. The computer-implemented method of claim 4, wherein the URL is a dedicated URL that is specific to the participant.

6. The computer-implemented method of claim 1, further comprising:
   identifying, by the one or more processors, and based on the participant data object, an email address associated with the participant; and
   causing, by the one or more processors, transmission of an electronic meeting invitation to the email address, the electronic meeting invitation indicating information associated with the virtual meeting based on at least one of the meeting data object or the participant data object.

7. The computer-implemented method of claim 1, further comprising causing, by the one or more processors, a user interface of the CRM platform to display information associated with the virtual meeting based on at least one of the meeting data object or the participant data object.

8. The computer-implemented method of claim 1, further comprising:
   receiving, by the one or more processors, and from a host device via the CRM platform, a request to join the virtual meeting; and
   causing, by the one or more processors, redirection of the host device from the CRM platform to the virtual meeting.

9. The computer-implemented method of claim 1, further comprising:
   receiving, by the one or more processors, and via the CRM platform, second input indicating edited meeting attributes associated with the virtual meeting;
   transmitting, by the one or more processors, and to the virtual meeting platform, an updated meeting request indicating the edited meeting attributes;
   receiving, by the one or more processors, and from the virtual meeting platform in response to the updated meeting request, updated meeting setup data; and
   adjusting, by the one or more processors, the meeting data object based on at least one of the second input or the updated meeting setup data.

10. The computer-implemented method of claim 1, further comprising:
    receiving, by the one or more processors, and via the CRM platform, second input indicating second participant attributes of a second participant associated with the virtual meeting;
    generating, by the one or more processors, and based on the second input, a second participant data object, linked to the meeting data object, that stores the second participant attributes;
    transmitting, by the one or more processors, and to the virtual meeting platform, an updated meeting request indicating second data based on the participant data object;
    receiving, by the one or more processors, and from the virtual meeting platform in response to the updated meeting request, second meeting setup data; and
    adjusting, by the one or more processors, the second participant data object based on the second meeting setup data.

11. A computing system, comprising:
    one or more processors; and
    memory storing computer-executable instructions associated with a customer relationship management (CRM) platform that, when executed by the one or more processors, cause the CRM platform to:
       receive first input indicating meeting attributes of a virtual meeting,
       generate a meeting data object, in the CRM platform, that stores the meeting attributes;
       receive second input indicating participant attributes of a participant associated with the virtual meeting;
       generate a participant data object, in the CRM platform, and linked to the meeting data object, that stores the participant attributes;
       transmit, to a virtual meeting platform separate from the CRM platform, a meeting request indicating data based on at least one of the meeting data object or the participant data object;
       receive, from the virtual meeting platform in response to the meeting request, meeting setup data associated with hosting of the virtual meeting by the virtual meeting platform; and
       adjust at least one of the meeting data object or the participant data object based on the meeting setup data.

12. The computing system of claim 11, wherein:
the meeting setup data indicates a virtual meeting identifier and a Uniform Resource Locator (URL) that the virtual meeting platform associates with the virtual meeting,
the CRM platform adjusts the meeting data object to indicate the virtual meeting identifier, and
the CRM platform adjusts the participant data object to indicate the URL.

13. The computing system of claim 11, wherein the computer-executable instructions further cause the CRM platform to:
identify, based on the participant data object, an email address associated with the participant; and
transmit, to the email address, an electronic meeting invitation indicating information associated with the virtual meeting based on at least one of the meeting data object or the participant data object.

14. The computing system of claim 11, wherein the computer-executable instructions further cause the CRM platform to:
receive third input indicating edited meeting attributes associated with the virtual meeting;
transmit, to the virtual meeting platform, an updated meeting request indicating the edited meeting attributes;
receive, from the virtual meeting platform in response to the updated meeting request, updated meeting setup data; and
adjust the meeting data object based on at least one of the third input or the updated meeting setup data.

15. The computing system of claim 11, wherein the computer-executable instructions further cause the CRM platform to:
receive third input indicating second participant attributes of a second participant associated with the virtual meeting;
generate a second participant data object, in the CRM platform, and linked to the meeting data object, that stores the second participant attributes;
transmit, to the virtual meeting platform, an updated meeting request indicating second data based on the participant data object;
receive, from the virtual meeting platform in response to the updated meeting request, second meeting setup data; and
adjust the second participant data object based on the second meeting setup data.

16. One or more non-transitory computer-readable media storing computer-executable instructions associated with a customer relationship management (CRM) platform that, when executed by one or more processors, cause the one or more processors to:
receive first input indicating meeting attributes of a virtual meeting,
generate a meeting data object, in the CRM platform, that stores the meeting attributes;
receive second input indicating participant attributes of a participant associated with the virtual meeting;
generate a participant data object, in the CRM platform, and linked to the meeting data object, that stores the participant attributes;
transmit, to a virtual meeting platform separate from the CRM platform, a meeting request indicating data based on at least one of the meeting data object or the participant data object;
receive, from the virtual meeting platform in response to the meeting request, meeting setup data associated with hosting of the virtual meeting by the virtual meeting platform; and
adjust at least one of the meeting data object or the participant data object based on the meeting setup data.

17. The one or more non-transitory computer-readable media of claim 16, wherein:
the meeting setup data indicates a virtual meeting identifier and a Uniform Resource Locator (URL) that the virtual meeting platform associates with the virtual meeting,
the one or more processors adjust the meeting data object to indicate the virtual meeting identifier, and
the one or more processors adjust the participant data object to indicate the URL.

18. The one or more non-transitory computer-readable media of claim 16, wherein the computer-executable instructions further cause the one or more processors to:
identify, based on the participant data object:
an email address associated with the participant; and
a Uniform Resource Locator (URL) that the virtual meeting platform associates with the virtual meeting; and
transmit, to the email address, an electronic meeting invitation indicating the URL.

19. The one or more non-transitory computer-readable media of claim 16, wherein the computer-executable instructions further cause the one or more processors to:
receive third input indicating at least one of edited meeting attributes or additional participant data associated with an additional participant associated with the virtual meeting;
transmit, to the virtual meeting platform, an updated meeting request based on the third input;
receive, from the virtual meeting platform in response to the updated meeting request, updated meeting setup data; and
adjust, based on at least one of the third input or the updated meeting setup data, at least one of:
the meeting data object, or
a second participant data object associated with the additional participant.

20. The one or more non-transitory computer-readable media of claim 16, wherein the computer-executable instructions further cause the one or more processors to:
receive, from a host device via the CRM platform, a request to join the virtual meeting; and
cause redirection of the host device from the CRM platform to the virtual meeting.

* * * * *